Figure 1:
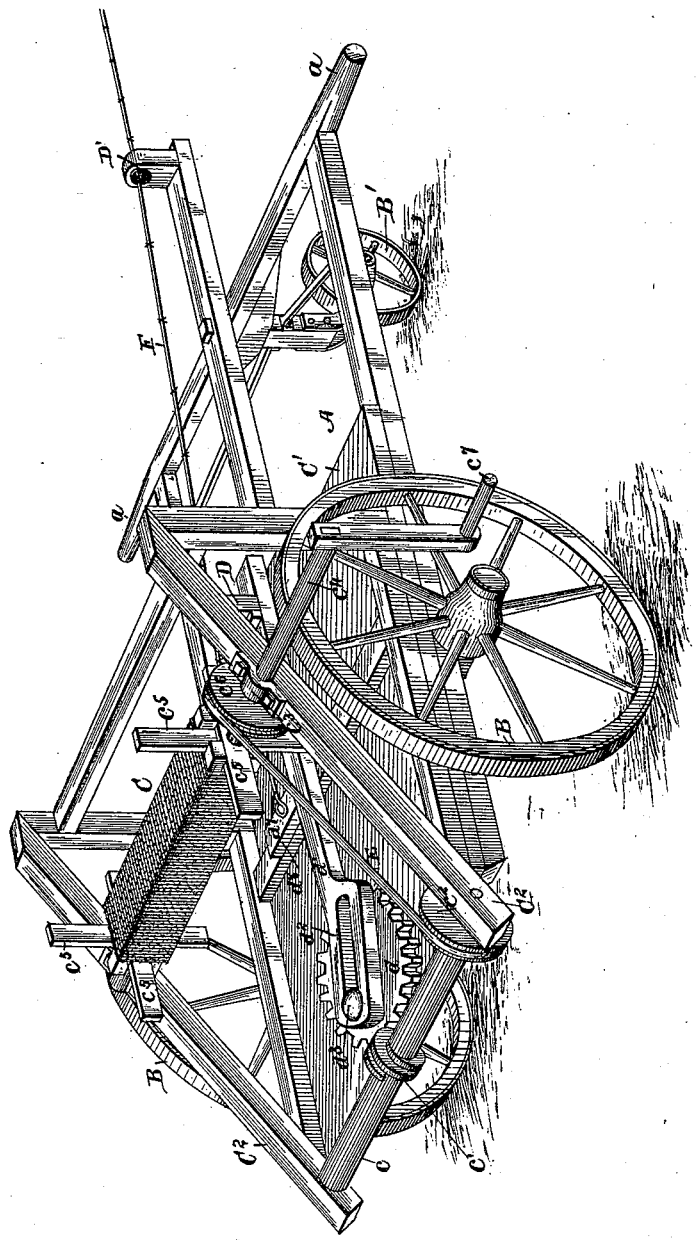

(No Model.)  2 Sheets—Sheet 1.

C. J. PRESTON.
WIRE REEL.

No. 464,082. Patented Dec. 1, 1891.

Witnesses
Jas. K. McCathran
J. W. Biggers

Inventor
C. J. Preston
By his Attorneys,
C. A. Snow & Co.

THE NORRIS PETERS CO., PHOTO-LITHO., WASHINGTON, D. C.

(No Model.) 2 Sheets—Sheet 2.
C. J. PRESTON.
WIRE REEL.
No. 464,082. Patented Dec. 1, 1891.
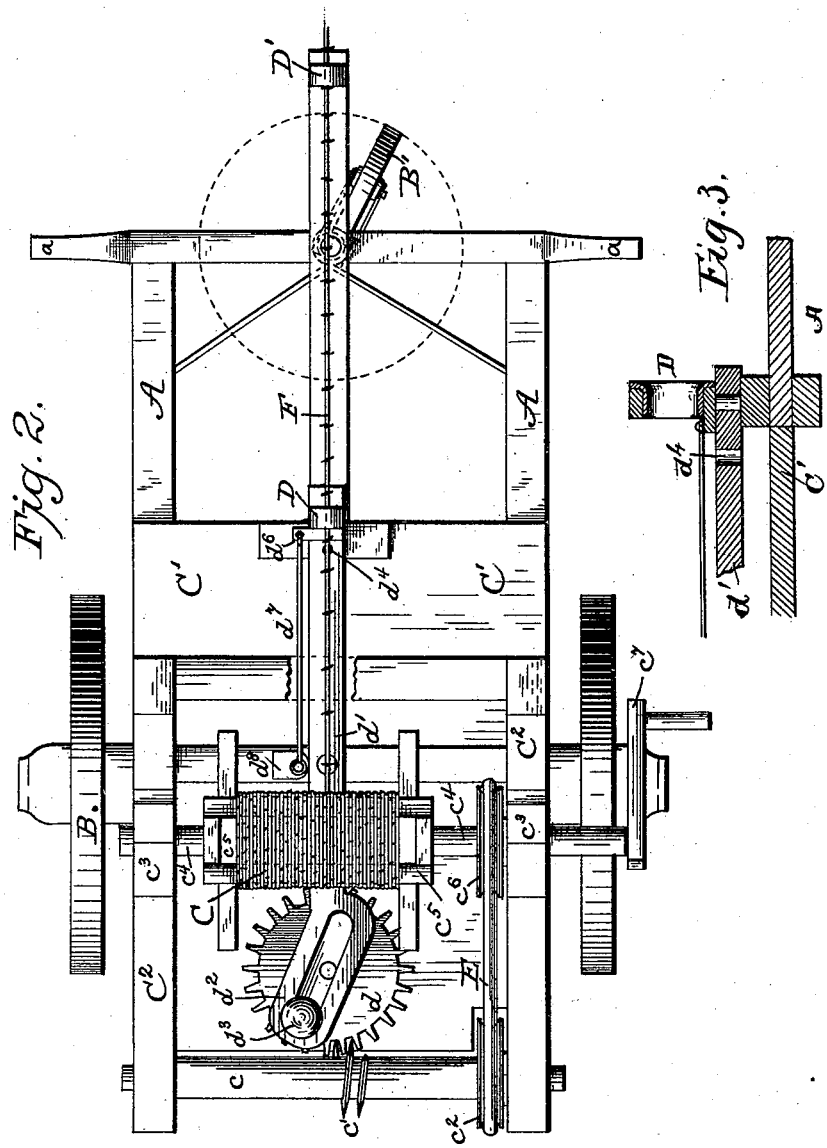
Witnesses:
F. M. Burnham
J. W. Siggers
Inventor
C. J. Preston
By his Attorneys,
C. A. Snow & Co.

UNITED STATES PATENT OFFICE.

CHARLES J. PRESTON, OF PIQUA, KANSAS.

WIRE-REEL.

SPECIFICATION forming part of Letters Patent No. 464,082, dated December 1, 1891.

Application filed April 25, 1891. Serial No. 390,453. (No model.)

*To all whom it may concern:*

Be it known that I, CHARLES J. PRESTON, a citizen of the United States, residing at Piqua, in the county of Woodson and State of Kansas, have invented a new and useful Wire-Reel, of which the following is a specification.

This invention is an improvement in wire-reels, and especially in those which are to be transported from place to place.

The object of the invention is to produce a wire-reel by the use of which wire may be coiled upon the reel evenly throughout the length of the reel and without extra labor or trouble.

The invention has for further objects the production of a wire-reel which will be compact, simple in construction and operation, effective in use, comparatively cheap of manufacture, and which will save the wire which is coiled from the wear and tear usually incident to the operation of coiling.

With these objects in view the invention resides in the various novel details of construction and in the combination of parts hereinafter fully described, and particularly pointed out in the claims.

In the drawings in which I have illustrated my invention, and in which like letters of reference indicate corresponding parts, Figure 1 is a perspective view of my device. Fig. 2 is a plan view thereof, and Fig. 3 is a detail section of the swiveled eye.

In the drawings, the letter A designates the frame of my improved wire-reel, which is supported upon the wheels B and the caster-wheel B'. As shown in the drawings, the frame forms a hand-cart and is provided with handles $a$; but of course the form of the cart may be varied at pleasure. Mounted upon the cart or carriage is the wire-reel mechanism, which is designated by the letter C. This mechanism is mounted in a frame which consists of a platform C' and triangular frames $C^2$, arising from said platform on either side thereof and supporting between them the wire-reel proper. At the rear of these triangular frames a shaft $c$ is journaled, which carries a worm-thread $c'$ and a pulley or sprocket-wheel $c^2$.

$c^3$ designates journal-boxes formed on the triangular frames, the said journal-boxes supporting the shaft $c^4$. This shaft $c^4$ carries the wire-reel proper, which is designated by the letter $c^5$, and is an ordinary wire-spool. This spool or reel $c^5$ is secured to the shaft $c^4$ by a spline. The shaft $c^4$ has fast to it the pulley or sprocket-wheel $c^6$, and beyond the frame has upon its end the crank-handle $c^7$. Upon the platform is journaled the cog-wheel $d$, which meshes with the worm-thread $c'$. Pivoted to the platform in front of the wheel $d$ is a lever $d'$, which has at its end a slotted angular projection $d^2$. A wrist $d^3$ on the wheel $d$ rests within the slot in the angular projection $d^2$. The lever $d'$ has upon its forward end perforations $d^4$, which are provided to afford pivotal support for the eye D. This eye D consists of an O-shaped loop having a stud on its under part and a projection $d^6$ on its side. A rod $d^7$ connects this projection $d^6$ with a raised piece $d^8$ near the center of the platform. This rod is pivoted at either end and is provided for the purpose of changing the angle which the O-shaped loop or eye D makes with lines parallel to the longitudinal center of the device. At the forward end of the machine, suitably supported, is another eye stationary in respect to the frame, which is designated by the letter D'. This eye is circular and is provided with a flaring mouth. Both the eyes are made of smooth hard steel to prevent the barbs on a wire from cutting into them. A sprocket chain or belt E connects the pulley or sprocket-wheel $c^2$ with the pulley or sprocket-wheel $c^6$ and transmits motion from the shaft $c^4$ through the shaft $c$ and the gearing connected therewith to the lever $d'$, and gives the said lever a reciprocating or oscillating motion as the shaft $c^4$ is turned. It will thus be seen that whenever wire is threaded through the eyes D' D and has its end secured to the spool or reel $c^5$ by turning the crank $c^7$ the wire will be wound upon the reel in a regular and even manner, as the lever $d'$ will be swung first to one side and then to the other, and will thus guide the wire upon the spool first from one side to the other and then back, the wire being laid in even courses. In this operation the rod $d^7$ serves an important purpose, as it turns the eye D first to one side and then to the other, so that the wire, which is shown in the drawings and indicated by the letter F, may pass through the said eye with the least possible friction upon its sides.

When the wire has once been wound upon the reel, the reel may be taken from the frame and kept until used or transported; but if it be desired to unwind the reel and lay the wire in order to construct fences the said wire is taken out of the eyes D' and D and the cart turned around and the belt or sprocket-chain E removed from the pulleys or sprocket-wheels $c^2$ and $c^6$. When this has been done, the wire will feed itself out as the carriage is rolled along the ground.

Having thus described my invention, what I claim, and desire to secure by Letters Patent, is—

1. In a wire-reel, the combination of a car having a rectangular platform, the triangular frames mounted on the platform, the shaft $c^4$, journaled near the top of the frames, a reel carried by said shaft, a shaft $c$, journaled at the bottom of the frame and provided with a worm, a horizontally-disposed cog-wheel mounted on the platform and meshing with the worm and having a wrist-pin, a lever fulcrumed on the platform and provided at its front end with a rocking eye, and a rod having one end secured to the platform and its other end connected to the eye and having a slot at its rear end to receive the wrist-pin, substantially as described.

2. In a wire-reel, the combination, with the frame, the spool, a lever pivoted intermediate its ends, and means for turning the reel and for transmitting motion from the same to the lever, whereby the lever is caused to oscillate, of an eye pivoted in the forward end of the lever and having upon its side a projection to which is pivoted a rod which has its other end pivoted to the frame, whereby as the lever is oscillated the angle made by the said eye with lines parallel to the longitudinal axis of the frame will be unchanged, all substantially as and for the purpose set forth.

In testimony that I claim the foregoing as my own I have hereto affixed my signature in presence of two witnesses.

CHARLES J. PRESTON.

Witnesses:
GEORGE I. ELDRIDGE,
RICHARD A. ELDRIDGE.